United States Patent [19]

Smith

[11] Patent Number: 4,981,332
[45] Date of Patent: Jan. 1, 1991

[54] DISPERSION-COMPENSATED WINDSHIELD HOLOGRAM VIRTUAL IMAGE DISPLAY

[75] Inventor: Ronald T. Smith, Redondo Beach, Calif.

[73] Assignee: Hughes Aircraft Company, Los Angeles, Calif.

[21] Appl. No.: 373,962

[22] Filed: Jun. 29, 1989

[51] Int. Cl.$^5$ .......................... G03H 1/02; G03H 1/22
[52] U.S. Cl. .................................... 350/3.6; 350/3.85; 350/174
[58] Field of Search ...................... 350/3.7, 3.81, 3.72, 350/174, 3.85, 3.6, 3.75

[56] References Cited

U.S. PATENT DOCUMENTS

| | | | |
|---|---|---|---|
| 4,613,200 | 9/1986 | Hartman | 350/3.7 |
| 4,737,001 | 4/1988 | Moss | 350/3.6 |
| 4,790,613 | 12/1988 | Moss | 350/3.85 |
| 4,795,223 | 1/1989 | Moss | 350/3.85 |
| 4,807,951 | 2/1989 | Moss | 350/3.85 |

FOREIGN PATENT DOCUMENTS

63-194201(A) 11/1988 Japan .

Primary Examiner—Bruce Y. Arnold
Assistant Examiner—David R. Parsons
Attorney, Agent, or Firm—Leonard A. Alkov; Wanda Denson-Low

[57] ABSTRACT

A virtual image display including an image hologram, a dispersion compensating hologram for providing playback illumination to the image hologram, and an illumination source for providing playback illumination to the dispersion compensating hologram.

16 Claims, 6 Drawing Sheets

FIG. 4A (a) IMAGE BLUR $\Delta\theta_i$ AT HOLOGRAM VS. SPECTRAL BANDWIDTH $\Delta\lambda_c$
(APPLIES TO BOTH REFLECTION AND TRANSMISSION HOLOGRAMS)

FIG. 4B

(b) IMAGE BLUR $\Delta\theta_E$ AT EYE VS. HOLOGRAM IMAGE DEPTH $R_i$

FIG. 5
DISPERSION BLUR FOR A SINGLE HOLOGRAM IMAGE POINT

FIG. 6A
REFLECTION HOLOGRAM

FIG. 6B
TRANSMISSION HOLOGRAM

OFF-AXIS REFLECTION HOLOGRAM: $\Delta\lambda_c \leq 1.51 nm, R_i = 40'', R_v = 25'', \& \lambda_{co} = 543 nm$

FIG. 8B

ON-AXIS DISPERSION COMPENSATED HOLOGRAM: $\Delta\lambda_c \leq 17.9 nm, R_i = 40'', R_v = 25'', \& \lambda_{co} = 543 nm$

FIG. 9

DISPERSION-COMPENSATED WINDSHIELD HOLOGRAM VIRTUAL IMAGE DISPLAY

BACKGROUND OF THE INVENTION

The disclosed invention relates generally to head-up windshield hologram virtual image displays, and more particularly is directed to a head-up windshield virtual image display which produces a virtual image having image components located relatively far ahead of the windshield and in different virtual image planes.

Head-up displays for vehicles such as automobiles are utilized to produce a virtual image instrument display at or ahead of the vehicle windshield, which provides for increased safety since reading of the head-up display by the vehicle operator does not require shifting of the field of view or refocusing of the eyes.

Head-up displays generally produce virtual images by playback of an image hologram, which can be located on or in the windshield, or by reflection of an image source by a beamsplitter such as a coating applied to the windshield for example.

However, if a virtual image hologram system utilizes a broadband light source, the virtual image must be located close to the image hologram to avoid image blurring dispersion. In order to produce a virtual image relatively far ahead of the windshield that is not blurred, a narrowband light source must be utilized, which can be too expensive or too dim for some purposes.

With a head-up display in which the image originates in an image source it is difficult and probably not possible to produce multiple virtual images that are in different image planes and overlap with the more distant virtual images being viewable through the closer images.

SUMMARY OF THE INVENTION

It would therefore be an advantage to provide a head-up windshield display that utilizes a broadband light source and produces a virtual image relatively far ahead of the windshield.

Another advantage would be to provide a head-up windshield display that utilizes a broadband light source and produces a virtual image having image components relatively far ahead of the windshield and in different virtual image planes.

The foregoing and other advantages are provided by the invention in a head-up display for a vehicle having a windshield that includes an image hologram and a dashboard which includes a light source and a compensating mirror hologram.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

In the following detailed description and in the several figures of the drawing, like elements are identified with like reference numerals.

Figure 1:
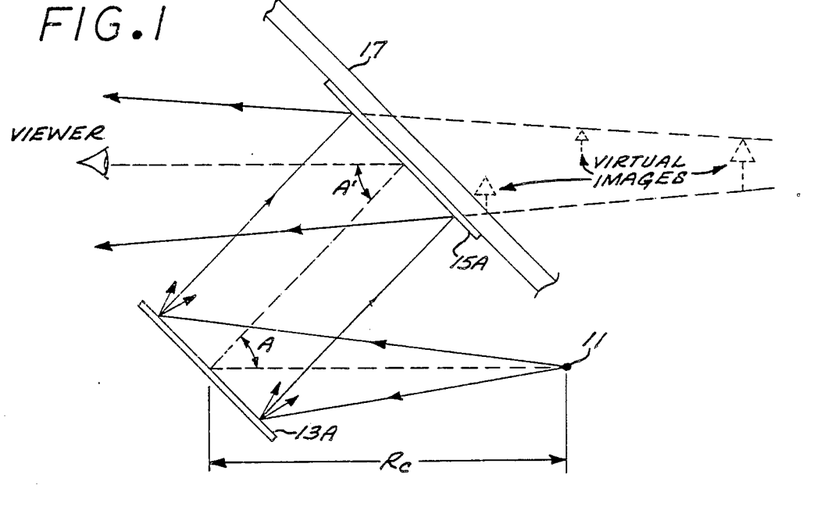
FIG. 1 is a schematic elevational view of a head-up display in accordance with the invention.

Referring now to FIG. 1, shown therein is a head-up holographic virtual image display for a vehicle such as an automobile. The head-up display includes a broadband light source 11, a dispersion compensating volume reflection hologram 13A, and an image volume reflection hologram 15A. The image hologram 15A is supported by the windshield 17 of a vehicle, for example, on the inside surface thereof or between windshield layers.

The compensating hologram 13A is located a distance $R_c$ from the source 11 and provides diffracted illumination to the image hologram 15A as the playback illumination therefor. The diffracted illumination from the compensating hologram 13A is at an angle A relative to the source illumination. The diffracted illumination from the image hologram 15A is at angle A' relative to the playback illumination provided by the compensating hologram 13A.

Preferably, the compensating hologram 13A and image hologram 15A are close to parallel so as to minimize chromatic dispersion. If (a) the holograms are parallel, (b) the distance to a virtual image component and the distance $R_c$ are equal, and (c) the angles A and A' are equal, the image point for that image component has virtually no chromatic dispersion when viewed from anywhere within the eyebox. It should be noted that although in FIG. 1 the diffracted illumination from the compensating hologram 13A appears to be normal to both holograms, that is not a necessary condition when the holograms are parallel.

If the holograms are not parallel, then the image distance, the source distance $R_c$, and the angles A, A' can be chosen so that the image point has no dispersion only when viewed from one point within the eyebox. Chromatic dispersion increases monotonically with distance from that point. The effects of the foregoing parameters on dispersion will be discussed in more detail further herein.

It should be noted, however, that in practice the holograms can be reasonably non-parallel without suffering from excessive chromatic dispersion. For example, non-parallelism of about 10 to 20 degrees provides a display with acceptable dispersion.

Pursuant to the playback illumination provided by the compensating hologram 13A, a virtual image is produced which appears to be ahead of the windshield 17. As more specifically discussed herein, the virtual image can be located relatively far ahead of the windshield, and can have virtual image components located at different image planes.

By way of example, the image hologram 15A comprises an image of vehicle or engine status indicators, and the light source 11 is selectively activated by control circuitry to illuminate the image hologram 15A at appropriate times to produce a virtual image indicative of a predetermined condition and viewable by the operator of the vehicle.

While only one image hologram is shown, it should be realized that a plurality of image holograms could be utilized with respectively associated light sources and compensating holograms.

Figure 2A:
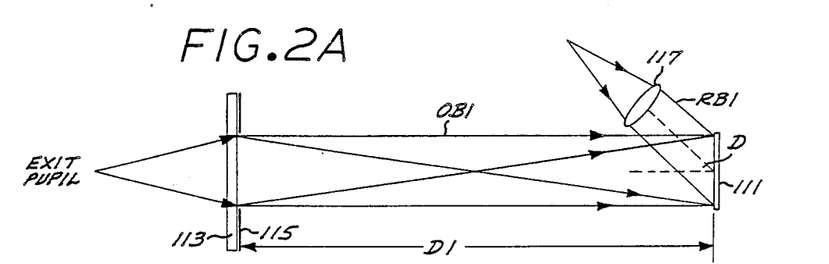
FIGS. 2A and 2B schematically show by way of illustrative example a process for recording the image hologram of the head-up display of FIG. 1.
Figure 2B:
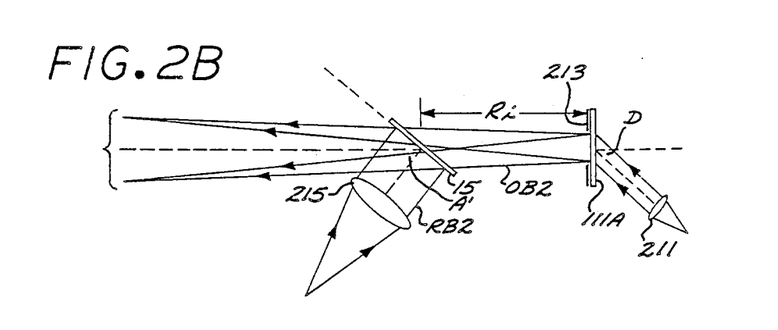

Referring now to FIGS. 2A and 2B shown therein are views showing by way of illustrative example a process for recording the image hologram 15A. The process generally involves recording a first hologram with the image of a diffuser, and then recording on the second hologram the playback of the first hologram together with an image mask. The second hologram is installed as the image hologram 15.

Referring specifically to FIG. 2A, a silver halide film 111 is exposed to an object beam OB1 and a reference beam RB1. The illumination for producing the object and reference beams are provided pursuant to known techniques, for example by a laser output of long coherence length which is P-polarized (i.e., polarized parallel to the plane of FIG. 2A) and then divided by a beam splitter (not shown) so as to provide at the silver halide film a reference beam that has about 4 to 10 times the intensity of the object beam (i.e., a reference beam to object beam intensity ratio of about 4/1 to 10/1). The laser output is P-polarized to reduce reflectivity off the back (non-incident) surface of the recording film. Such reflectivity, if not controlled, would cause unwanted reflection holograms to be formed. Each of the split beams is optically controlled to be a diverging beam, which for example can be achieved by a microscope objective lens and an iris.

Preferably, the optical path lengths for the respective illumination that produces the object beam OB1 and the reference beam RB1 are made substantially equal, which can be accomplished pursuant to known techniques including the use of appropriate lenses and/or relay mirrors.

The diverging beam for the object beam OB1 is provided to a diffuser 113 whose illumination output is masked by an exit pupil mask 115 located a distance D1 from the film 111 to provide the object beam OB1 which is roughly normal to the silver halide film 111. Alternatively, the diverging beam for the object beam could be collimated prior to the diffuser 113.

The diverging beam for the reference beam RB1 is collimated by a collimating lens 117 to produce the reference beam RB1 which is incident on the silver halide film at an angle D relative to the object beam OB1.

The silver halide film 111 is developed to provide a first hologram 111A which is played back in the step illustrated in FIG. 2B wherein the image hologram 15A is recorded. By way of illustrative example, a dichromated gelatin (DCG) film 15 is exposed to an object beam OB2 and a reference beam RB2, which are based on diverging beams that conveniently can be provided by the same source that provided the diverging beams in the process step depicted in FIG. 2A. The respective beams preferably should also have the same optical path lengths to the DCG film 15.

The diverging beam for the object beam OB2 is collimated by a collimating lens 211 whose output is incident at the angle D on the first hologram 111A which is in the same orientation as the silver halide film 111 in FIG. 2A, the collimated object beam OB2 provided by the collimating lens 211 being essentially the reverse of the collimated reference beam RB1 utilized in FIG. 2A. An image mask 213 adjacent the first hologram 111A masks the playback output of the first hologram 111A and defines the image of the status indicator to be recorded. The image plane of the virtual image ahead of the image hologram is determined by the distance $R_i$ between the DCG film 15 and the mask/hologram structure.

The diverging beam for the reference beam RB2 is collimated by a collimating lens 215 and forms the angle A' relative to the object beam OB2. The angle A' in recording is determined by the desired playback angle A' (FIG. 1). As is well known, the recording angle A' can be different from the playback angle A', depending on factors including the relationship between the recording illumination wavelength and the average wavelength of playback, and the swelling or shrinking of the recording medium during chemical processing.

To the extent it is desired to produce an image having multiple image components, possibly at different image planes, each image component would require a different image mask 213 and a separate exposure of the DCG film 15. Each different image component could be recorded to appear at different image planes by varying the distance $R_i$ between the DCG film 15 and the mask-/hologram hologram structure for the different image component masks.

The exposed DCG film 15 is developed and processed to produce the image hologram 15A that is secured to the vehicle windshield. Particularly, the hologram 15A is secured to the vehicle windshield in the same orientation as in FIG. 2B with the operator location being to the left of the hologram 111A so that the virtual image would be located at the same relative location as the mask/hologram structure.

Figure 3:
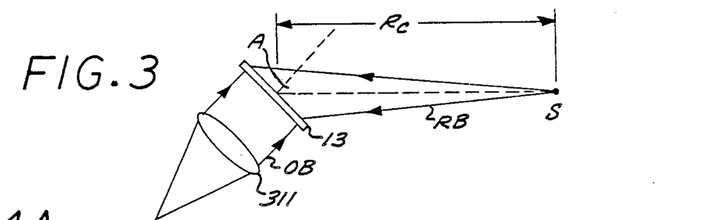
FIG. 3 schematically shows by way of illustrative example a process for recording the dispersion compensation reflection hologram of the head-up display of FIG. 1.

Referring now to FIG. 3, shown therein is a process for recording the dispersion compensating hologram 13A by exposing a dichromated gelatin recording film 13 to a reference beam RB and an object beam OB. As with the recording of the image hologram 15A, the object beam OB and the reference beam RB are based on the same illumination source. However, the respective intensities of the object beam OB and the reference beam RB should be substantially the same (i.e., an intensity ratio of 1/1).

The reference beam RB is a diverging beam that has an apparent point source located at the distance $R_c$ from the DCG film 13, which is the same as the distance $R_c$ between the light source 11 and the compensating hologram 13A in FIG. 2.

The diverging beam for the object beam OB is collimated by a collimating lens 311 whose output is the object beam OB. The incidence angle of the collimated object beam OB is determined by the desired direction of the diffracted illumination from the dispersion compensating hologram 13A, in the system of FIG. 1, in that the diffracted illumination would be in the direction defined by continuing the path of the object beam OB on the other side of the DCG film 13. Thus, for example, for a 0 degree object beam incidence angle, the diffracted beam would be also be at 0 degrees. The object beam OB and the reference beam RB are oriented to form an included angle A which is determined by the desired playback angle A in FIG. 1. As is well known, the recording angle A can be different from the playback angle A, depending on factors including the relationship between the recording illumination wavelength and the average wavelength of playback, and the swelling or shrinking of the recording medium during chemical processing.

A preferred playback configuration is for the compensating and image holograms to be parallel and for the angles A and A' to be equal. Therefore, the collimated object beam OB in FIG. 3 is incident on hologram 13 at the same angle as reference beam RB2 in FIG. 2B is incident on hologram 15. The particular angles chosen are not important, as long as they are equal to each other. In addition, the angle A in FIG. 3 is equal to angle A' in FIG. 2B.

After exposure, the DCG film 13 is developed to produce the hologram 13A which after any appropriate lamination to a substrate is utilized as the dispersion compensating hologram 13A in FIG. 1 in the same orientation as shown in FIG. 3, with the hologram 13A being illuminated by the broadband light source instead of the diverging reference beam RB.

The advantages of the invention can be better understood by analysis of a virtual image hologram which is illuminated without a dispersion compensating hologram. The image hologram produces a virtual image which can be viewed by the observer, and in principle this virtual image can be located outside of the plane of the hologram. However, in practice, the phenomenon of chromatic dispersion severely reduces the distance away from the hologram the image can be located to produce an acceptably sharp image. Chromatic dispersion is the phenomenon describing the fact that the angle of diffraction of a ray of light from a hologram is dependent on its wavelength. The result is that when a beam of light having non-zero spectral bandwidth is incident on the hologram, the hologram diffracts the light in a fan of rays each having different wavelengths, so that the overall image is blurred. For an image located exactly in the plane of the hologram, the chromatic dispersion causes no image blurring, but as the image is moved away from the hologram the image blur increases rapidly.

The explicit dependence of image diffracted angle $\theta_i$ on wavelength $\lambda_c$ and incident angle $\theta_c$ for an image hologram is given by:

$$\theta_i = \sin^{-1}(\lambda_c f \pm \sin\lambda_c) \quad \text{(Equation 1)}$$

where "+" is used for a reflection hologram, and "−" is used for a transmission hologram, and where f is the surface fringe frequency that is given by:

$$f = (\sin\theta_0 \pm \sin\theta_r)/\lambda_0 = (\sin\theta_{i0} \pm \sin\theta_{c0})/8_{0\,c0} \quad \text{(Equation 2)}$$

where "+" is for a reflective hologram and "−" is for a transmission hologram, and where $\lambda_0$ is the exposure wavelength, $\theta_0$ is the object beam angle, $\theta_r$ is the reference beam angle, $\theta_{i0}$ is the playback diffracted angle off the image hologram for light of wavelength $\lambda_{c0}$, $\theta_{c0}$ is the playback angle incident on the image hologram with respect to normal, and $\lambda_{c0}$ is the hologram peak wavelength (wavelength at which the hologram diffraction is maximized), all angles in air. Differentiating diffracted angle $\theta_i$ with respect to wavelength, we have:

$$d\theta_i/d\lambda_c = f/\cos\theta_{i0} \quad \text{(Equation 3)}$$

Therefore, for a light source having a spectral bandwidth $\Delta\lambda_c$ the chromatic dispersion induced blur in the plane of incidence is:

$$\Delta\theta_i = \Delta\lambda_c f/\cos\theta_{i0} \quad \text{(Equation 4)}$$

Figure 4A:
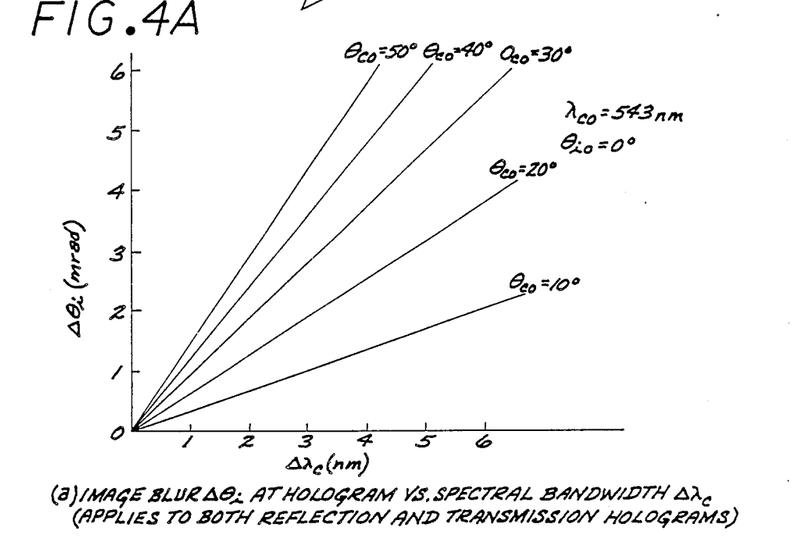
FIG. 4 illustrates the amount of angular image blur at the eye versus image depth for various hologram angular blurs.
Figure 5:
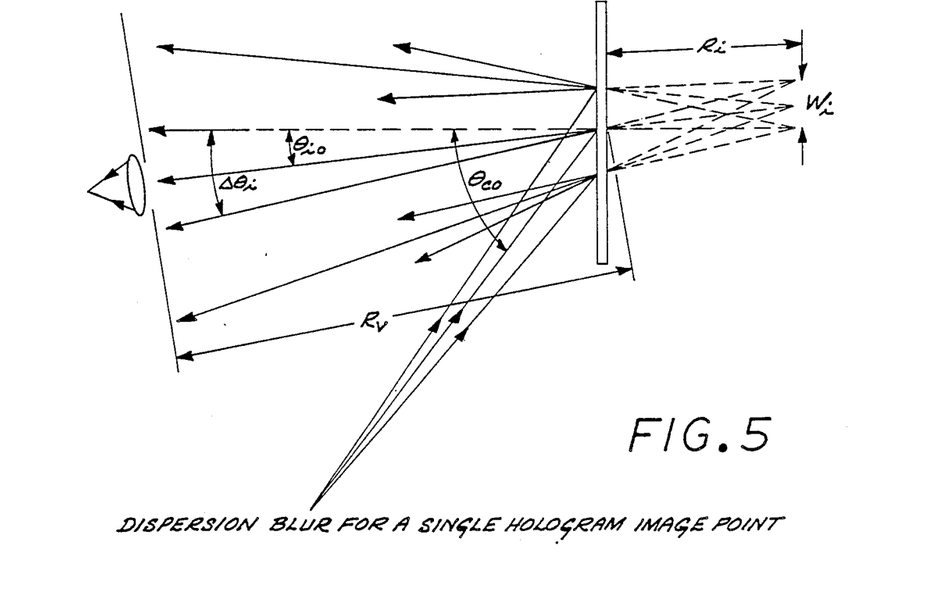
FIG. 5 is a model which illustrates image blur from a hologram for a particular image point.

This dependence is illustrated in FIG. 4A for the special case where $\theta_{i0}=0$, and applies to both transmission and reflection holograms. As shown in FIG. 5, the apparent size $w_i$ of the blurred image point is approximately:

$$w_i \cong R_i \Delta\theta_i \quad \text{(Equation 5)}$$

where $R_i$ is the distance between the hologram and the virtual image.

Figure 4B:
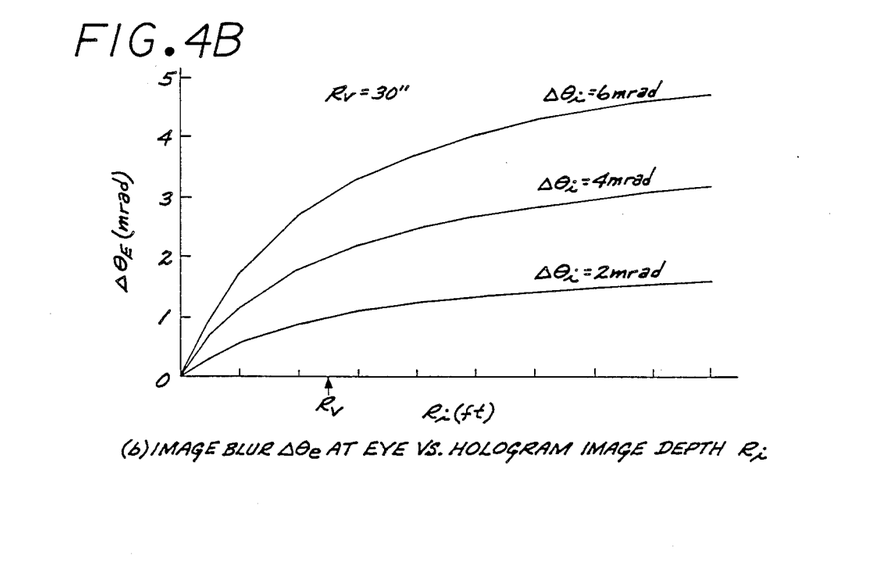

The apparent image blur $\Delta\theta_e$ at the focal plane of an imaging system such as the eye located a distance $R_v$ from the hologram is approximately:

$$\Delta\theta_e = \Delta\theta_i/(1+R_v/R_i) \quad \text{(Equation 6)}$$

which is independent of pupil diameter. The above equation indicates that the apparent image blur $\Delta\theta_e$ is dependent on the hologram to image distance $R_i$. When the image lies in the plane of the hologram there is no image blur, and the blur increases monotonically as the image distance from the hologram increases. For the realistic case where $R_v=30''$, and the viewer's iris diameter $w_e=0.2''$ (5 mm), the apparent image blur vs. hologram blur and image to hologram distance is shown in FIG. 4B.

The upper limit for light source bandwidth $\Delta\lambda_c$ as a function of maximum acceptable image blur $\Delta\theta_{emax}$ is given by:

$$\Delta\lambda_c < \lambda_{c0} \cos\theta_{i0}\Delta_{emax}(1+R_v/R_i)/(\sin\theta_{c0} \pm \sin\theta_{i0}) \quad \text{(Equation 7)}$$

where "+" is for transmission holograms and "−" is for reflection holograms.

Therefore, reducing the apparent image blur in a hologram image lying far from the hologram basically requires reducing the image blur $\Delta\theta_i$ at the hologram, which is given by Equation 4. This basically requires (a) minimizing the slant of the hologram fringes by equalizing the incident and diffracted angles, or (b) minimizing the light source spectral bandwidth. However, making the incident and diffracted angles equal means that first surface reflections off the hologram substrate surfaces will enter the viewer's eyebox and will interfere with viewing of the virtual images. For this reason, an image hologram that is illuminated directly without a compensating hologram is preferably illuminated with a beam normal to its surface so the first surface reflected light will return to the light source region and be trapped. However, the windshield is highly tilted with respect to the viewer and with respect to the diffracted image rays. Therefore, unless the light source spectral bandwidth can be made to be very narrow, the resultant chromatic dispersion will be very high.

The currently existing narrowband light sources are either too expensive and power consuming or are too dim to be usable in many environments, such as an automobile. Lasers produce highly monochromatic light, but they are too expensive, too power consuming, and too susceptible to shock and vibration to be useful. Mercury arc lamps are capable of providing narrowband high intensity light in the yellow, but they are too expensive and power consuming to be practical. One can generate narrowband light by placing a narrowband spectral filter in front of a broadband source such as an incandescent lamp, but most of the broadband light would be filtered, and the resulting transmitted light is too dim to produce a usable image. Therefore, unless some means can be found to somehow reduce or eliminate dispersion in this display, virtual images located far from the windshield will not be practically achievable.

Figure 6A:
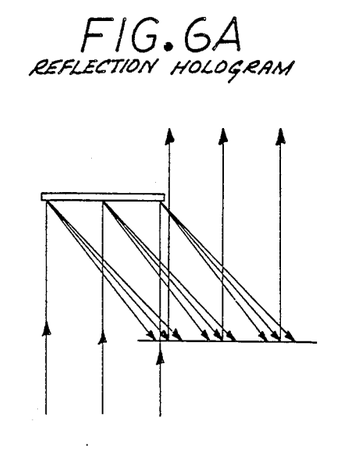
FIG. 6A and B illustrate two possible configurations which implement this invention.
Figure 6B:
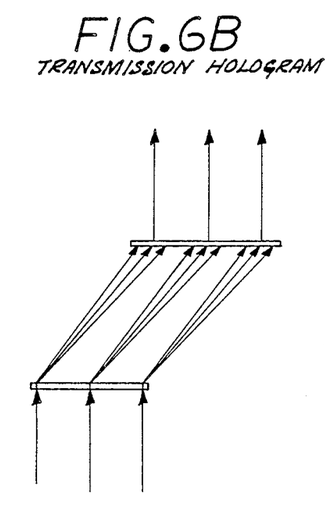

The disclosed invention utilizes dispersion compensation, which involves predispersing the playback illumination for the image hologram so as to compensate for the disperson off the image hologram being viewed, resulting in a sharp virtual image. As shown in FIGS. 6A and 6B, the invention utilizes a predispersing grating or hologram, and is applicable to both transmission and reflection hologram systems. The transmission hologram system will work; however, the reflection hologram system is the preferred embodiment of this invention for an automobile display.

In looking at the reflection hologram configurations in FIGS. 6A and 6B, it is noted that each hologram is an efficient volume hologram, and therefore the combined efficiency is high, but the combined bend angle (the angle between the ray incident on the first hologram and the ray diffracted off the second hologram) can approach 0. Therefore, the white light incident on the first hologram is dispersed strongly, but when this dispersed light encounters the image hologram, it is redispersed strongly in the opposite direction, resulting in a nearly nondispersed image beam heading toward the viewer. It appears intuitively that for a pictorial hologram at least one point on the hologram image can be fully compensated for and show no dispersion. However, there is likely to be residual dispersion for other image points. The key question is what is the magnitude of this residual dispersion and how is the best way of minimizing it in a dispersion compensated hologram.

Figure 7:
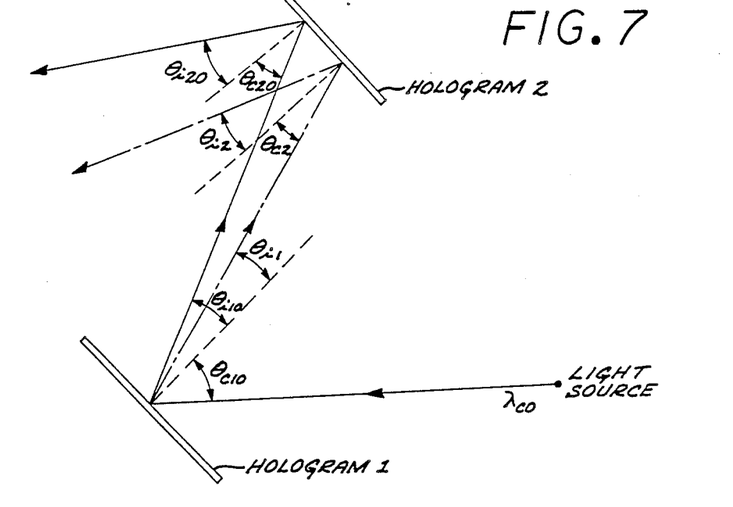
FIG. 7 is a model of a dispersion-compensating virtual image display for a particular ray of light from the source.

A fundamental property of the dispersion compensated holograms of the invention can be realized by analyzing the general case illustrated in FIG. 7. A ray having wavelength $\lambda_{c0}$ is incident on the compensating hologram 1 at angle $\theta_{c10}$ and is diffracted at angle $\theta_{i10}$. This diffracted ray is incident on the image hologram 2, where it is rediffracted at an angle $\theta_{i20}$. For a general wavelength $\lambda_c$, the diffracted angle $\theta_{i2}$ can be determined as follows. Using Equation 1, the angle of diffraction $\theta_{i1}$ off of hologram 1 is given by:

$$\theta_{i1} = \sin^{-1}((\sin\theta_{i10} - \sin\theta_{c10})\lambda_c/\lambda_{c0} + \sin\theta_{c10}) \quad \text{(Equation 8)}$$

The angle of diffraction $\theta_{i2}$ off of hologram 2 is given by:

$$\theta_{i2} = \sin^{-1}((\sin\theta_{i20} - \sin\theta_{c20})\lambda_c/\lambda_{c0} + \sin\theta_{c2}) \quad \text{(Equation 9)}$$

Furthermore, for parallel holograms the compensating hologram 1 diffracted rays are related to image hologram 2 incident rays by:

$$\theta_{c20} = \theta_{i10} \quad \text{(Equation 10)}$$

$$\theta_{c2} = \theta_{i1} \quad \text{(Equation 11)}$$

where $\theta_{c20}$ is the incident angle onto image hologram for light of wavelength $\lambda_{c0}$ and $\theta_{c2}$ is the incident angle onto the image hologram for light of wavelength $\lambda_c$.

Assume the center of the image is situated so that $$\theta_{i20} = \theta_{c10} \quad \text{(Equation 12)}$$

Combining Equations 8-12, the image hologram 2 diffracted angle $\theta_{i2}$ is given simply by:

$$\theta_{i2} = \theta_{i20} \quad \text{(Equation 13)}$$

Therefore, the dispersion compensated hologram is able to totally compensate for dispersion at one point of the hologram image. For image points away from the center of the image, Equation 12 no longer holds and the residual dispersion can be described by:

$$\theta_{i2} = \sin^{-1}[(\sin\theta_{i20} - \sin\theta_{c10})\lambda_c/\lambda_{c0} + \sin\theta_{c10}) \quad \text{(Equation 14)}$$

Figure 8A:
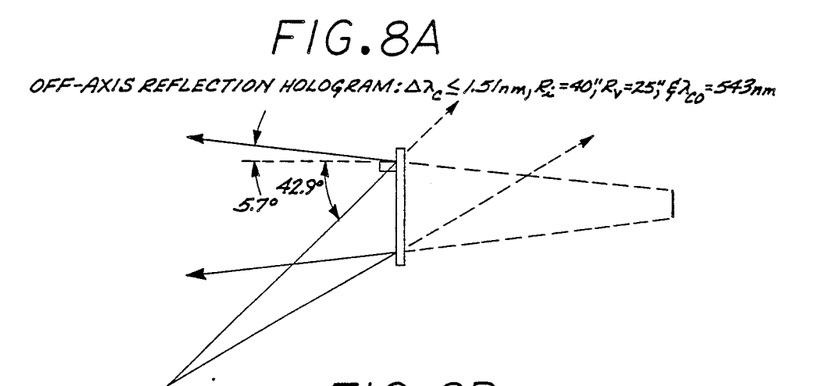
FIG. 8A is an example of an image hologram which does not use a compensating hologram which requires illumination from a very narrow bandwidth light source.
Figure 8B:
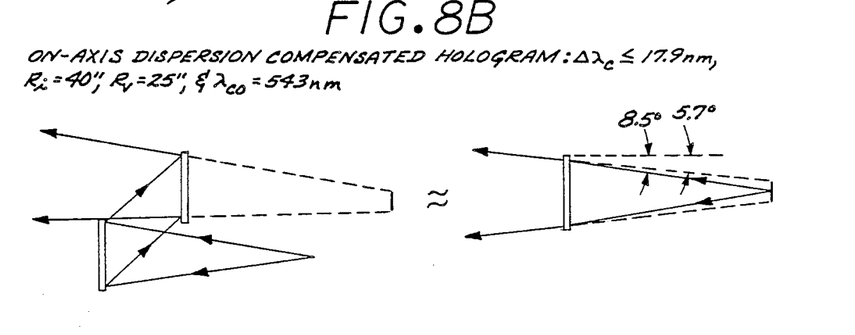
FIG. 8B is an example of a dispersion compensating system using an image hologram and a compensating hologram, in which the required illumination spectral bandwidth is quite large.

An example of how dispersion compensation is able to substantially reduce the dispersion problem will now be discussed with reference to the reflection hologram geometry shown in FIGS. 8A and 8B. Assume we are 25" from the hologram and are viewing a 4" high virtual image located 40" behind the hologram. Also assume that the maximum tolerable image blur is 1 mrad. For the case of a hologram display having no dispersion compensation (FIG. 8A), Equation 13 yields the following tight requirement: $\Delta\lambda_c < 1.51$. However, in a dispersion compensated hologram with the light source placed at the center of the image (when the two holograms are hypothetically superimposed as in FIG. 8B), the maximum bend angle (difference between incident and diffracted rays) at the hologram is $8.5° - 5.7° = 2.8°$, and the resultant spectral bandwidth requirement is much more relaxed: $\Delta\lambda_c < 17.9$. This is comparable to the spectral bandwidth of the hologram itself. Therefore, we can use a broadband light source such as an incandescent lamp, and the resultant hologram image brightness can be about 12 times brighter for the dispersion compensated image than for a non-dispersion compensated image viewed with a 1.51 nm filter. Therefore, the dispersion compensated hologram is able to display virtual images appreciable distances behind the hologram using practical light sources and achieving high image brightness.

Figure 9:
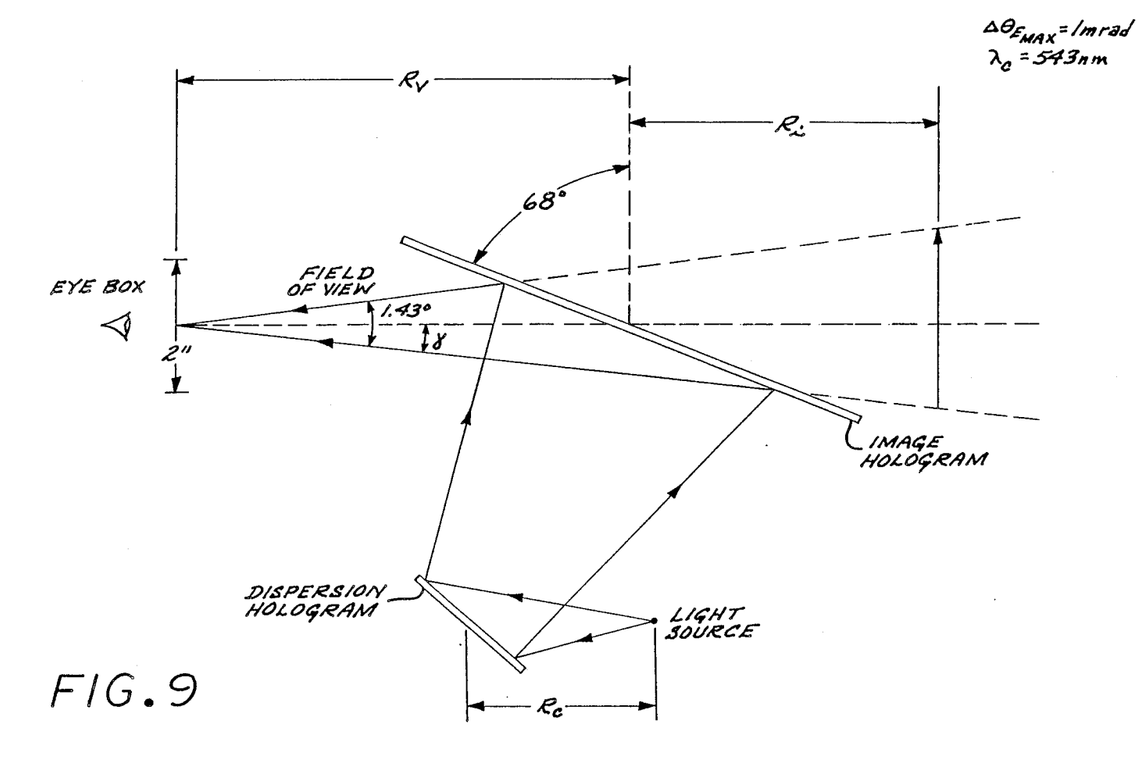
FIG. 9 is an example of a dispersion compensating hologram system in which the residual dispersion at an angle $\alpha$ from the center of the image is considered.
Figure 10:
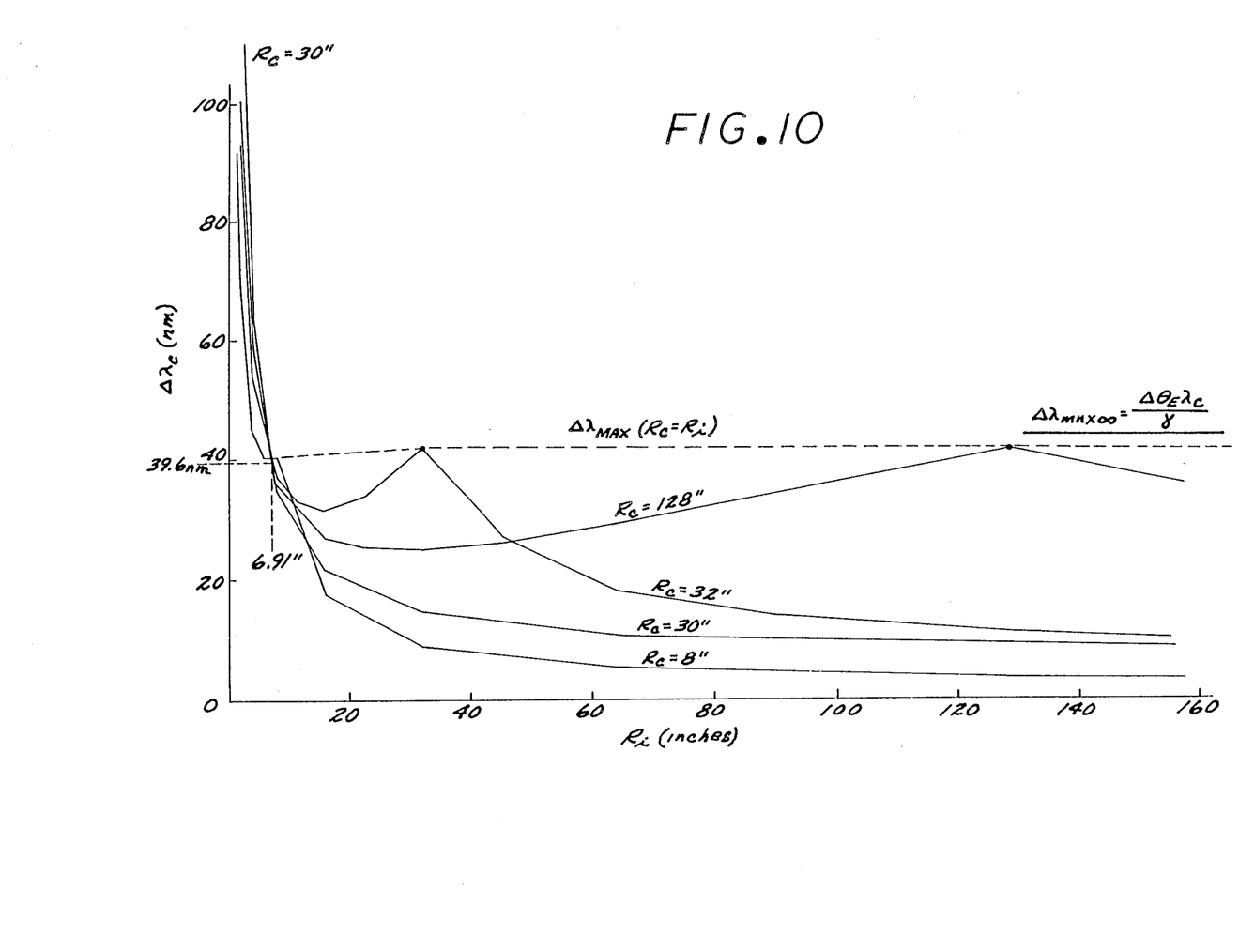
FIG. 10 is a graph which illustrates the spectral bandwidth required to yield an image blur less than 1 mrad, versus $R_i$ and $R_c$.

Looking at the example presented in FIG. 9, and assuming a 543 nm peak wavelength, a 1 mrad maximum acceptable image blur, a 4" high eyebox, a 30" viewing distance to the hologram, a 1.43 degree image, and a 68 degree nominal diffracted ray angle off the hologram, how does the required spectral bandwidth vary as the distance of the image behind the hologram varies? The results illustrated in FIG. 10 show that, with the exception of the region close behind the hologram, it is best to place the image center a distance $R_c$ behind the hologram, which allows the broadest spectral bandwidth. This optimized far-field spectral bandwidth is:

$$\Delta\lambda_{max} = \Delta\theta_e \lambda_c / \gamma. \quad \text{(Equation 15)}$$

where $\gamma$ is is one-half of the angle subtended by the virtual image relative to the center of the eyebox, within the plane of the rays. Thus, for example, a virtual image that is one inch high and located 50 inches from the eyebox would subtend a half-angle $\gamma$ of 0.5729 (the inverse tangent of 0.5/50).

Furthermore, when $R_c$ is relatively large (e.g., greater than 128"), there is a large depth of field where the virtual images shall appear reasonably sharp. Therefore, this invention is capable of generating a multitude of virtual images which are placed at different image planes (and overlapped if desired), which have sharp image quality.

As mentioned earlier, if the dispersion compensating hologram and the image hologram are non-parallel, the chromatic dispersion will be greater than if the holograms are parallel. However, the angles A and A' in FIG. 1 can be selected pursuant to the following criteria so as to minimize the chromatic dispersion.

Referring to FIG. 7, for non-parallel holograms, $\theta_{c20} \neq \theta_{i10}$ and:

$$\theta_{c20} = \theta_{i10} + \alpha \quad \text{(Equation 16)}$$

$$\theta_{c2} = \theta_{i1} + \alpha \quad \text{(Equation 17)}$$

where $\alpha$ is the amount of non-parallelism.

Combining Equation 17 with Equation 9 provides the following expression which explicitly defines that $\theta_{i1}$ is a function of $\lambda_c$:

$$\theta_{i2} = \sin^{-1}[(\sin\theta_{i20} - \sin\theta_{c10})\lambda_c/\lambda_{c0} + \sin(\theta_{i1}(\lambda_c) + \alpha)] \quad \text{(Equation 18)}$$

Differentiating Equation 18 with respect to $\lambda_c$ for $\theta_{i2} = \theta_{i20}$ results in:

$$\frac{d\theta_{i2}}{d\lambda_c} = (1/\cos\theta_{i20})[(\sin\theta_{i20} - \sin\theta_{c20})/\lambda_{c0} + \cos(\theta_{i10} + \alpha)(\sin\theta_{i10} - \sin\theta_{c10})/\lambda_{c0}\cos\theta_{i10}] \quad \text{(Equation 19)}$$

For no dispersion, Equation 19 is set equal to 0, which yields the necessary condition for achieving minimum chromatic dispersion with non-parallel holograms:

$$\cos\theta_{i10}(\sin\theta_{i20} - \sin\theta_{c20}) = \cos\theta_{c20}(\sin\theta_{c10} - \sin\theta_{i10}) \quad \text{(Equation 20)}$$

When the foregoing condition is met, the angles A' and A will be close in value but not equal, the angle A' being $\theta_{i20} + \theta_{c20}$ and the angle A being $\theta_{i10} + \theta_{c10}$.

The foregoing has been a disclosure of a virtual image display system which advantageously produces a non-blurred virtual image relatively far from the image hologram which stores the image without the use of a spectrally narrowband light source, and further can display an image having different image components located at different image planes.

Although the foregoing has been a description and illustration of specific embodiments of the invention, various modifications and changes thereto can be made by persons skilled in the art without departing from the scope and spirit of the invention as defined by the following claims.

What is claimed is:

1. A virtual image display comprising:
    an image hologram having a plurality of image components recorded therein, said image components configured to produce virtual image components at different virtual image planes;
    a source of illumination;
    compensating means responsive to said source illumination for providing to said image hologram playback illumination that is chromatically predispersed so as to compensate for the chromatic dispersion of said image hologram, said image hologram producing in response to said playback illumination virtual image components of said recorded image components which are relatively sharp over a depth of field greater than would be produced without said compensation means.

2. The virtual image display of claim 1 wherein said compensating means comprises a dispersing hologram.

3. The virtual image display of claim 1 wherein said image hologram produces a virtual image that is displaced from said image hologram.

4. The virtual image display of claim 1 wherein said illumination is a spectrally broadband source.

5. The virtual image display of claim 1 wherein said image hologram comprises a reflection hologram.

6. The virtual image display of claim 1 wherein said virtual image components are overlapping.

7. A virtual image display comprising:
    an image hologram having an image recorded therein;
    a source of spectrally broadband illumination;
    a dispersing hologram responsive to said source illumination for providing to said image hologram playback illumination that is chromatically predispersed so as to compensate for the chromatic dispersion of said image hologram, said image hologram producing in response to said playback illumination a virtual image of said recorded image having a depth of field greater than would be produced without said compensation means.

8. The virtual image display of claim 7 wherein said image hologram produces a virtual image that is displaced from said image hologram.

9. The virtual image display of claim 7 wherein said image hologram produces a virtual image having image components located at different virtual image planes.

10. The virtual image display of claim 9 wherein said virtual image components are overlapping.

11. A virtual image display for a vehicle having a windshield, comprising:
    an image reflection hologram having an image recorded therein and supported by the vehicle windshield for producing pursuant to playback illumination a virtual image viewable by the operator of the vehicle;
    a source of illumination
    compensating means responsive to said source illumination for providing to said image hologram playback illumination that is chromatically predispersed so as to compensate for the chromatic dispersion of said image hologram, said image hologram producing in response to said playback illumination a virtual image of said recorded image having a depth of field greater than would be produced without said compensation means.

12. The virtual image display of claim 11 wherein said compensating means comprises a dispersing hologram.

13. The virtual image display of claim 11 wherein said image hologram produces a virtual image that is displaced from said image hologram.

14. The virtual image display of claim 11 wherein said image hologram produces a virtual image having image components located at different image planes.

15. The virtual image display of claim 14 wherein said virtual image components are overlapping.

16. The virtual image display of claim 11 wherein said illumination is a spectrally broadband source.

* * * * *